US007465377B2

(12) United States Patent
Paris et al.

(10) Patent No.: US 7,465,377 B2
(45) Date of Patent: Dec. 16, 2008

(54) METHOD FOR DESTROYING A NUCLEAR GRAPHITE BY GASIFICATION IN AQUEOUS MEDIUM

(75) Inventors: Jacques Paris, Bagnols S Ceze (FR); Jean-Raymond Costes, Uchaux (FR)

(73) Assignee: Commissariat a l'Energie Atomique, Paris (FR)

( * ) Notice: Subject to any disclaimer, the term of this patent is extended or adjusted under 35 U.S.C. 154(b) by 905 days.

(21) Appl. No.: 10/498,700

(22) PCT Filed: Dec. 10, 2002

(86) PCT No.: PCT/FR02/04253

§ 371 (c)(1),
(2), (4) Date: Jun. 9, 2004

(87) PCT Pub. No.: WO03/050208

PCT Pub. Date: Jun. 19, 2003

(65) Prior Publication Data

US 2005/0124842 A1 Jun. 9, 2005

(30) Foreign Application Priority Data

Dec. 11, 2001 (FR) ................................... 01 15974

(51) Int. Cl.
*B01J 19/08* (2006.01)

(52) U.S. Cl. ....................................... 204/164; 588/237

(58) Field of Classification Search ................. 204/173, 204/164; 588/237
See application file for complete search history.

(56) References Cited

U.S. PATENT DOCUMENTS 3,352,503 A 11/1967 Maroudas
3,458,417 A 7/1969 Allen et al.
3,529,776 A 9/1970 Meszaros
3,770,212 A 11/1973 Kassir et al.
4,279,710 A 7/1981 Coughlin
4,566,961 A 1/1986 Diaz et al.
5,159,900 A 11/1992 Dammann
5,792,325 A 8/1998 Richardson, Jr.

(Continued)

FOREIGN PATENT DOCUMENTS

DE 247 858 A1 7/1987

(Continued)

OTHER PUBLICATIONS

Office Action received from U.S. Patent and Trademark Office for copending U.S. Appl. No. 10/498,259, mailed Feb. 6, 2006.

(Continued)

*Primary Examiner*—Kishor Mayekar
(74) *Attorney, Agent, or Firm*—Brinks Hofer Gilson & Lione

(57) ABSTRACT

A process for the treatment of a nuclear graphite contaminated with radioelements includes subjecting the graphite, immersed in a medium containing water, to high-voltage pulses. The pulses have sufficient energy for electric arcs to be initiated and to break the constituent bonds of the water molecules and the carbon-carbon bonds of the graphite. The number of high-voltage pulses is determined so as to convert the graphite into gas.

9 Claims, 2 Drawing Sheets

U.S. PATENT DOCUMENTS

| | | | |
|---|---|---|---|
| 6,200,430 B1 | 3/2001 | Robert | |
| 6,319,391 B1 * | 11/2001 | Holderness et al. | 205/768 |
| 6,972,118 B2 * | 12/2005 | Santilli | 422/186.21 |
| 2005/0051644 A1 * | 3/2005 | Paris et al. | 241/1 |

FOREIGN PATENT DOCUMENTS

| | | |
|---|---|---|
| DE | 195 34 232 A1 | 3/1997 |
| FR | 1 423 592 A | 3/1966 |
| FR | 2 691 524 | 11/1993 |
| JP | 11202093 | 7/1999 |
| WO | WO 03/049865 | 6/2003 |

OTHER PUBLICATIONS

Office Action received from U.S. Patent and Trademark Office for copending U.S. Appl. No. 10/498,259, mailed Oct. 19, 2006.

Office Action received from U.S. Patent and Trademark Office for copending U.S. Appl. No. 10/498,259, mailed Nov. 13, 2007.

Office Action received from U.S. Patent and Trademark Office for copending U.S. Appl. No. 10/498,259, mailed Apr. 10, 2008.

International Search Report, prepared in a related International Application No. PCT/FR02/04254 (Published as WO03/049865), filed Dec. 10, 2002, which is U.S. Appl. No. 10/498,259.

* cited by examiner

METHOD FOR DESTROYING A NUCLEAR GRAPHITE BY GASIFICATION IN AQUEOUS MEDIUM

This application is a National Stage application of International Application No. PCT/FR 2002/04253 filed Dec. 10, 2002, the entire contents of which is hereby incorporated herein by reference. This application also claims the benefit under 35 U.S.C. § 119 of French Patent Application No.01 15974, filed Dec. 11, 2001, the entire contents of which is hereby incorporated herein by reference.

TECHNICAL FIELD

The present invention relates to a process for the destruction of a nuclear graphite contaminated with radioelements by gasification of the graphite in an aqueous medium.

The general field is therefore that of the treatment of nuclear waste, such as the graphite coming from a NUGG (natural uranium-graphite-gas) plant, recovered during the dismantlement of the said plant.

PRIOR ART

At the present time, the treatment of waste, such as nuclear graphite contaminated with radioelements, is carried out either by storing all the waste in suitable containers or by completely destroying the waste by combustion.

According to the abovementioned first alternative, the storing of nuclear waste and especially graphite requires the irradiated waste to be stored in containments that are then buried underground. This technique proves to be expensive and difficult to implement.

According to the abovementioned second alternative, the waste is milled firstly using a mechanical milling process, in a containment, so as to obtain a particle size low enough to then be able to constitute a fluidized bed or a suspension in fuel and to carry out the combustion of the particles thus produced.

However, such mechanical milling is difficult to apply in a confined medium and the conventional combustion processes release tritium, which escapes via the ventilation systems.

DESCRIPTION OF THE INVENTION

The object of the present invention is to propose a process for the treatment of nuclear graphite contaminated with radioelements, making it possible to overcome the abovementioned drawbacks of the prior art.

To do this, the subject of the invention is a process for the treatment of a nuclear graphite contaminated with radioelements, the said process comprising a step consisting in subjecting the said graphite, immersed in a medium containing water, to high-voltage pulses, the said pulses having sufficient energy for electric arcs to be initiated and to break the constituent bonds of the water molecules and the carbon-carbon bonds of the said graphite, the number of high-voltage pulses being determined so as to convert the said graphite into gas.

It should be pointed out that, according to the invention, the term "high-voltage pulses" is understood to mean electrical pulses that can convey a voltage of the order of one or more kilovolts, so as to obtain an electric arc within the water-containing medium. Hereafter, the reasoning will be in terms of electrical energy, this being the origin of the creation of electric arcs responsible by their interaction with the aqueous medium and with the conducting carbon material of the gasification of the said material.

Thus, by subjecting a graphite, immersed in a water-containing medium, to high-voltage pulses, the constituent carbon-carbon bonds of the graphite are broken, thereby creating activated species that can react with the radicals resulting from the decomposition of the water by the action of the same high-voltage pulses. The abovementioned reactions result in the formation of carbon monoxide CO, carbon dioxide $CO_2$ and hydrogen $H_2$.

The most probable reaction scheme is the following:

$$
\begin{aligned}
&\text{—C—} + E \longrightarrow \text{—C}^* \\
&2H_2O + E \longrightarrow 2OH\bullet + H_2 \\
&OH\bullet + H_2O \longrightarrow HO_2\bullet + H_2 \\
&OH\bullet + \text{—C}^* \longrightarrow CO + 1/2\,H_2 \\
&HO_2\bullet + \text{—C}^* \longrightarrow CO_2 + 1/2\,H_2 \\
&\text{-------------------------------------------} \\
&3H_2O + \text{—C—} + E \longrightarrow CO_2 + CO + 3H_2
\end{aligned}
$$

E represents the electrical energy conveyed by a high-voltage pulse, or more precisely the energy of the electric arcs, and —C— represents a carbon atom taken from a carbon-carbon bond.

Advantageously, this process results in a destruction of the nuclear graphite, the radioelements remaining trapped in the water-containing medium. In addition, this process advantageously makes it possible to produce gases, it being possible for the said gases to be recovered and reused for various applications.

According to the invention, to destroy the nuclear graphite, a person skilled in the art may choose the high-voltage pulse application conditions (energy, frequency, duration and number of pulses delivered) according to the nature of the graphite to be treated, it being understood that the higher the energy of the pulses, the fewer the number of pulses to be applied in order to obtain the said gasification.

According to the invention, the energy of the high-voltage pulses may be from 100 J to 100 kJ. Such a pulse energy value advantageously makes it possible, at each pulse, to break a large number of water molecules and of constituent carbon-carbon bonds of the graphite to be treated.

According to the invention, the high-voltage pulses may have a duration ranging from around 200 ns to 100 μs, preferably with a duration of 1 μs.

According to the invention, the high-voltage pulses may have a frequency ranging from 1 to 1000 Hz, preferably 10 Hz.

The water-containing medium may, according to the invention, advantageously contain at least one radical-stabilizing catalyst for stabilizing the aforementioned radicals formed.

Preferably, the nuclear graphite treatment process may advantageously include a step of discharging the said gases produced, for the purpose of using these gases produced. This step has the advantage of avoiding any overpressure phenomenon inherent in the production of gases in a closed medium and of carrying away the gases produced either to a storage place or to a treatment place.

According to one particular method of implementing the invention, the step of discharging the gases takes place by continuously sweeping the surface of the water-containing medium with an inert gas, preferably with nitrogen.

Advantageously, the nuclear graphite treatment process according to the invention preferably includes, after gasification of the graphite, a step of treating the water-containing medium. This treatment may correspond to the conventional treatment of liquid effluents, with the aim of recovering and reconcentrating, for example, the heavy metals initially contained in the graphite to be treated and released into the aqueous medium after gasification of the graphite. This treatment may also be intended for purifying the water-containing medium, in which the graphite gasification has taken place, of the radioelements released by the graphite.

For example, radioactive caesium, in ionic form in water, may be trapped by means of calixarenes or ion exchange resins. Cobalt, in oxide form, may be filtered. As regards tritium, this is fixed to water instead of hydrogen, by isotope exchange, and can then be concentrated for deactivation.

To implement the process, a CO removal system may be provided before the gases formed are discharged into the atmosphere. Provision may also be made to recover the $^{14}C$ from the $CO_2$ produced, for example using a laser isotope separation process.

Other features and advantages will become more clearly apparent on reading the examples that follow, these being given of course by way of illustration, with reference to the appended drawings.

DETAILED DESCRIPTION OF THE INVENTION

The process according to the invention consists in treating the nuclear graphite contaminated with radioelements by delivering high-voltage pulses into the said graphite in an aqueous medium.

To do this, the implementation of the process requires a suitable device.

Figure 1:
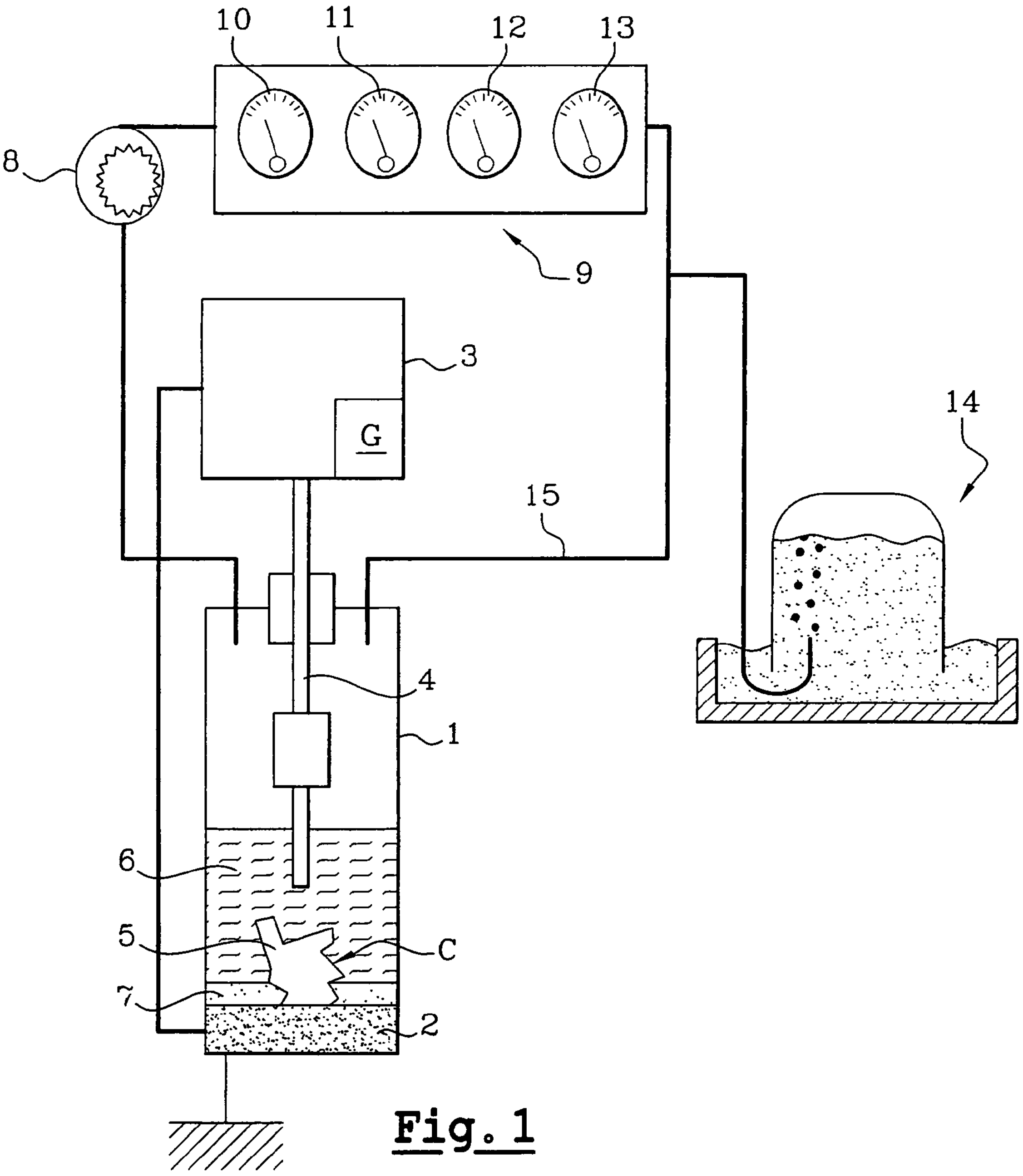
FIG. 1 illustrates one particular device for implementing the invention.

FIG. 1 illustrates such a device for carrying out the treatment on such a type of graphite.

This device comprises a non-metallic sealed reactor 1, for example made of polyethylene. The bottom of the reactor is a conducting plate, constituting the earth electrode 2, connected to a high-voltage generator 3, of the Marx generator type, the said generator supplying a high-voltage electrode 4, it being possible to adjust the distance between the earth electrode 2 and the high-voltage electrode 4 so as to be able to adjust the potential difference applied between these two electrodes. A block of nuclear graphite 5 is placed between the electrodes 2 and 4, the said block being completely immersed in water 6. This device makes it possible to deliver high-voltage pulses into the block. The pulses of given energy thus delivered cause the appearance of an electric arc between the electrodes, which arc, upon passing through the water, dissociates the latter into free radicals and breaks carbon-carbon bonds upon contact with the graphite, to form carbon radicals. The chemical reaction between the carbon atoms in the form of radicals and the radicals resulting from the decomposition of the water lead to the formation of CO, $CO_2$ and $H_2$. The gases 7 produced are conveyed, by means of a pump 8, to a gas detector 9 comprising carbon monoxide detection means 10, carbon dioxide detection means 11, oxygen detection means 12 and methane detection means 13. Once the gases produced have passed through the detector 9, they are sent back into the reactor 1.

A gas bell system 14 is provided in order to measure the gas production and avoid any overpressure.

A system (not shown in the said figure) intended to regenerate the aqueous medium, in order to maintain the quality of the said medium needed to form electric arcs, may be envisaged.

Illustrative Example According to FIG. 1

Placed in a reactor of the type described above were 10 g of graphite of nuclear origin as a single piece. The graphite was completely covered with water, the total volume of which was 1.5 l. Initially, the dead volume above the water was temporarily purged with nitrogen so as to remove oxygen from the air. Pulses of the order of 1 KJ were sent into the graphite. After a few minutes, the presence of carbon monoxide and hydrogen was detected, but no methane.

Figure 2:
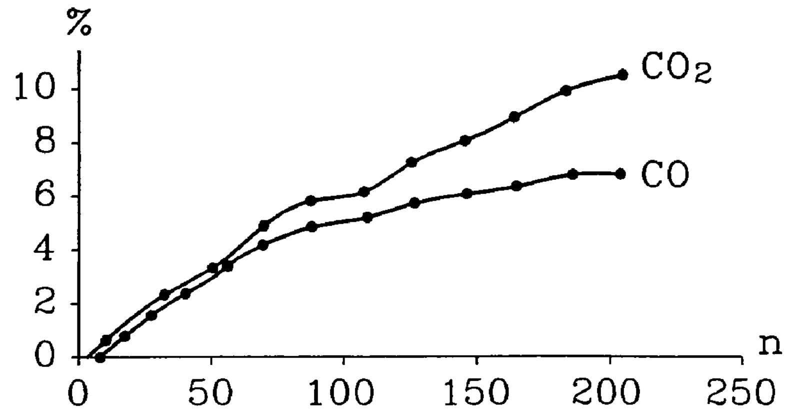
FIG. 2 shows curves illustrating the amount of gas produced (in %) as a function of the number n of high-voltage pulses, these curves resulting from an experiment using the device shown in FIG. 1.

FIG. 2 shows the amounts of carbon monoxide and carbon dioxide (in %) plotted as a function of the number n of pulses applied. This shows that the amount of CO, shown as the CO curve, and the amount of $CO_2$, shown as the $CO_2$ curve, increase with the number of pulses until reaching a kind of plateau, above 220 shots, depending on the operating conditions of this example.

Other devices for implementing the process according to the invention may be envisaged.

Figure 3:
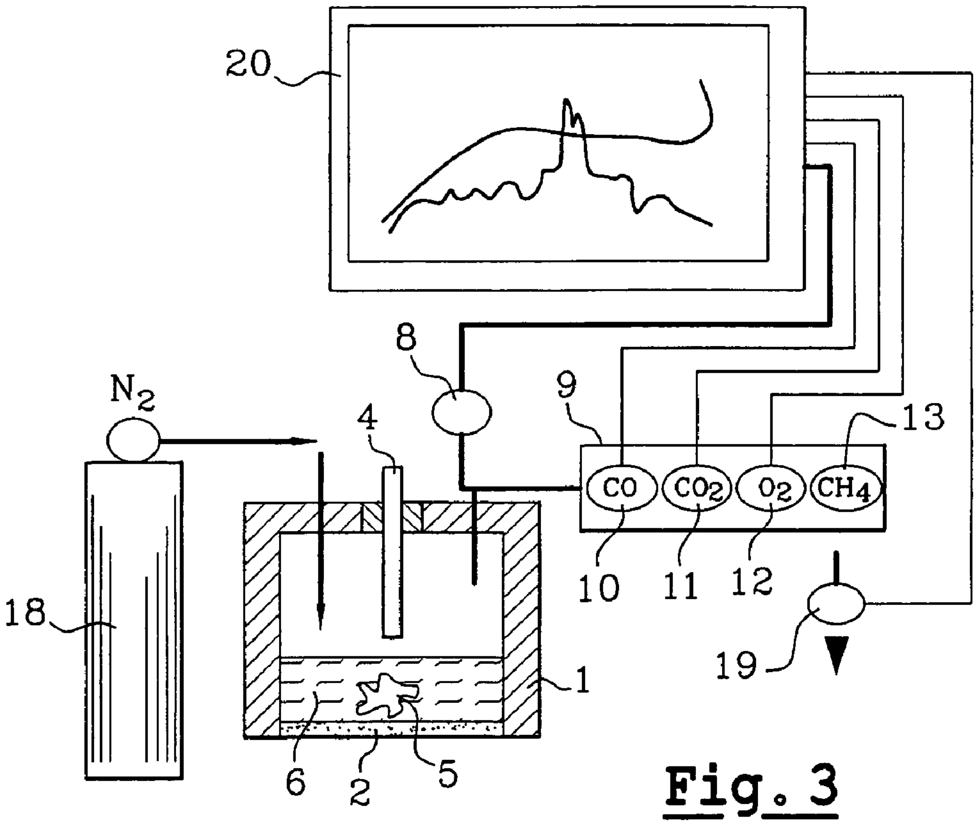
FIG. 3 illustrates another type of particular device for implementing the invention.

Thus, FIG. 3 illustrates a device for implementing the invention with, in this case, continuous sweeping with an inert gas. This figure shows a device similar to the previous one, except that the reactor 1 is fed with a continuous and constant stream of inert gas, such as $N_2$, by means of a bottle 18 provided with a pressure gauge. The gases produced are again sent into a detection device 9 provided with carbon monoxide detection means 10, carbon dioxide detection means 11, oxygen detection means 12 and methane detection means 13 by means of a pump 8, the whole assembly being connected to a data processing system 20 which in particular will produce curves demonstrating the amounts of gases produced at a given instant, given that the gases no longer stagnate in the reactor. A flowmeter 19 measures the flow rate of the total gases, which are discharged. The latter device is easier to manage, as it avoids the build-up of gases and prevents the possibility of explosive mixtures occurring.

The invention claimed is:

1. A process for treatment of a nuclear graphite contaminated with radioelements, the process comprising:

subjecting the graphite, immersed in a medium containing water, to a number of high-voltage pulses, the pulses having sufficient energy for electric arcs to be initiated and to break the constituent bonds of the water molecules and the carbon-carbon bonds of the graphite, the number of high-voltage pulses being determined to convert the graphite into gas.

2. The treatment process according to claim 1, wherein the energy of the high-voltage pulses is from 100 J to 100 kJ.

3. The treatment process according to claim 1, wherein the high-voltage pulses have a duration ranging from 200 ns to 100 μs.

4. The treatment process according to claim 1, wherein the high-voltage pulses have a frequency ranging from 1 to 1000 Hz.

5. The treatment process according to claim 1, wherein the water-containing medium contains at least one radical-stabilizing catalyst.

6. The treatment process according to claim 1, comprising:

discharging the gas produced for the purpose of using the gas produced.

7. The treatment process according to claim 6, wherein the step of discharging the gas is carried out by continuously sweeping with an inert gas.

8. The treatment process according to claim 7, wherein the inert gas is nitrogen.

9. The treatment process according to claim 1, comprising:

treating the water-containing medium after subjecting the graphite to a number of high-voltage pulses.

* * * * *